United States Patent
Clement et al.

(10) Patent No.: US 9,727,851 B2
(45) Date of Patent: Aug. 8, 2017

(54) PURCHASING DATA MANAGEMENT METHOD AND SYSTEM

(75) Inventors: Jean-Yves Clement, Saint-Jeannet (FR); Fabien Lanne, Valbonne (FR); Michel Porta, Cagnes-sur-mer (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 1784 days.

(21) Appl. No.: 12/323,548

(22) Filed: Nov. 26, 2008

(65) Prior Publication Data
US 2010/0131410 A1    May 27, 2010

(30) Foreign Application Priority Data
Nov. 24, 2008    (EP) .................................... 08305833

(51) Int. Cl.
| | |
|---|---|
| G06Q 20/00 | (2012.01) |
| G06Q 20/20 | (2012.01) |
| G06Q 20/38 | (2012.01) |
| G06Q 30/02 | (2012.01) |
| H04L 29/06 | (2006.01) |

(52) U.S. Cl.
CPC ........... *G06Q 20/209* (2013.01); *G06Q 20/20* (2013.01); *G06Q 20/387* (2013.01); *G06Q 30/02* (2013.01); *H04L 63/102* (2013.01)

(58) Field of Classification Search
CPC ...... G06Q 20/00–20/425; G06Q 30/00–30/08; G06Q 2220/00–2220/18
USPC .................................................. 705/50–79
See application file for complete search history.

(56) References Cited

U.S. PATENT DOCUMENTS

| | | | |
|---|---|---|---|
| 5,832,457 A * | 11/1998 | O'Brien et al. | 705/14.13 |
| 5,924,080 A * | 7/1999 | Johnson | 725/138 |
| 6,330,543 B1 * | 12/2001 | Kepecs | 705/14.17 |
| 6,679,421 B2 | 1/2004 | Shin et al. | |
| 7,398,248 B2 | 7/2008 | Phillips et al. | |
| 7,877,289 B1 * | 1/2011 | Cunningham et al. | 705/14.26 |

(Continued)

OTHER PUBLICATIONS

Definition of "encrypt," Microsoft Computer Dictionary, Microsoft Press, Fifth Edition, p. 192 (2002).*

(Continued)

*Primary Examiner* — Mohammad A Nilforoush
(74) *Attorney, Agent, or Firm* — Schmeiser, Olsen & Watts; John Pivnichny

(57) ABSTRACT

A data management method and system. The method includes retrieving by a computing system, first identification data associated with a buyer of a product. The computing system retrieves product data associated with the product. The product data is compared to campaign data associated with a campaign. The campaign is associated with an entity associated with the product. The computing system determines that the product is associated with the campaign. The computing system generates second identification data comprising the first identification data, an identification code for the product, a campaign code indicating that the product is associated with the campaign, and a date of purchase for the product. The computing system generates encrypted data comprising the second identification data in an encrypted format. The encrypted data is transmitted to a secure database system.

6 Claims, 3 Drawing Sheets

(56) References Cited

U.S. PATENT DOCUMENTS

| | | | |
|---|---|---|---|
| 7,911,346 B1* | 3/2011 | Claudatos et al. | 340/572.4 |
| 2001/0049627 A1* | 12/2001 | Simpson | 705/14 |
| 2004/0210481 A1* | 10/2004 | Quinlan et al. | 705/14 |
| 2004/0243478 A1* | 12/2004 | Walker et al. | 705/26 |
| 2005/0119979 A1* | 6/2005 | Murashita et al. | 705/67 |
| 2005/0188005 A1* | 8/2005 | Tune | 709/203 |
| 2006/0046842 A1* | 3/2006 | Mattice et al. | 463/29 |
| 2006/0095344 A1* | 5/2006 | Nakfoor | 705/26 |
| 2008/0120155 A1* | 5/2008 | Pliha | 705/7 |
| 2008/0224823 A1* | 9/2008 | Lawson et al. | 340/5.8 |

OTHER PUBLICATIONS

"Homomorphic encryption," Wikipedia, https://en.wikipedia.org/wiki/Homomorphic_encryption (Last Accessed: Jul. 5, 2015).*
"Hacker Lexicon: What Is Homomorphic Encryption?" Wired.com, http://www.wired.com/2014/11/hacker-lexicon-homomorphic-encryption/ (Nov. 3, 2014).*
SoftCoin Digital Proof of Purchase Solution; SoftCoin Inc., 2000 Sierra Point Parkway, Ste. 801, Brisbane, CA 94005; www.softcoin.com; 4 pages.

* cited by examiner

PURCHASING DATA MANAGEMENT METHOD AND SYSTEM

FIELD OF THE INVENTION

The present invention relates to a method and associated system for managing proof of purchase data for products.

BACKGROUND OF THE INVENTION

Determining valid data obtained in a retail environment typically comprises an inefficient process with little flexibility. Accordingly, there exists a need in the art to overcome at least some of the deficiencies and limitations described herein above.

SUMMARY OF THE INVENTION

The present invention provides a method comprising:
retrieving, by a computing system, first identification data associated with a first buyer, wherein said first buyer is associated with a first purchase of a first product;
retrieving, by said computing system from said first product, first product data associated with said first product;
comparing, by said computing system, said first product data to campaign data associated with a first campaign, wherein said first campaign is associated with a first entity, and wherein said first entity is associated with said first product;
determining, by said computing system based on said comparing, that said first product is associated with said first campaign;
generating, by said computing system in response to said determining, second identification data comprising said first identification data, an identification code for said first product, a campaign code indicating that said first product is associated with said first campaign, and a date of purchase for said first product;
generating, by said computing system, first encrypted data comprising said second identification data in an encrypted format; and
transmitting, by said computing system to a secure database system, said first encrypted data, wherein said first encrypted data is stored in said secure database system.

The present invention provides a computing system comprising a processor coupled to a computer-readable memory unit, said memory unit comprising instructions that when executed by the processor implements a purchasing data management method, said method comprising:
retrieving, by a computing system, first identification data associated with a first buyer, wherein said first buyer is associated with a first purchase of a first product;
retrieving, by said computing system from said first product, first product data associated with said first product;
comparing, by said computing system, said first product data to campaign data associated with a first campaign, wherein said first campaign is associated with a first entity, and wherein said first entity is associated with said first product;
determining, by said computing system based on said comparing, that said first product is associated with said first campaign;
generating, by said computing system in response to said determining, second identification data comprising said first identification data, an identification code for said first product, a campaign code indicating that said first product is associated with said first campaign, and a date of purchase for said first product;
generating, by said computing system, first encrypted data comprising said second identification data in an encrypted format; and
transmitting, by said computing system to a secure database system, said first encrypted data, wherein said first encrypted data is stored in said secure database system.

The present invention advantageously provides a simple method and associated system capable of determining valid data obtained in a retail environment.

DETAILED DESCRIPTION OF THE INVENTION

Figure 1:
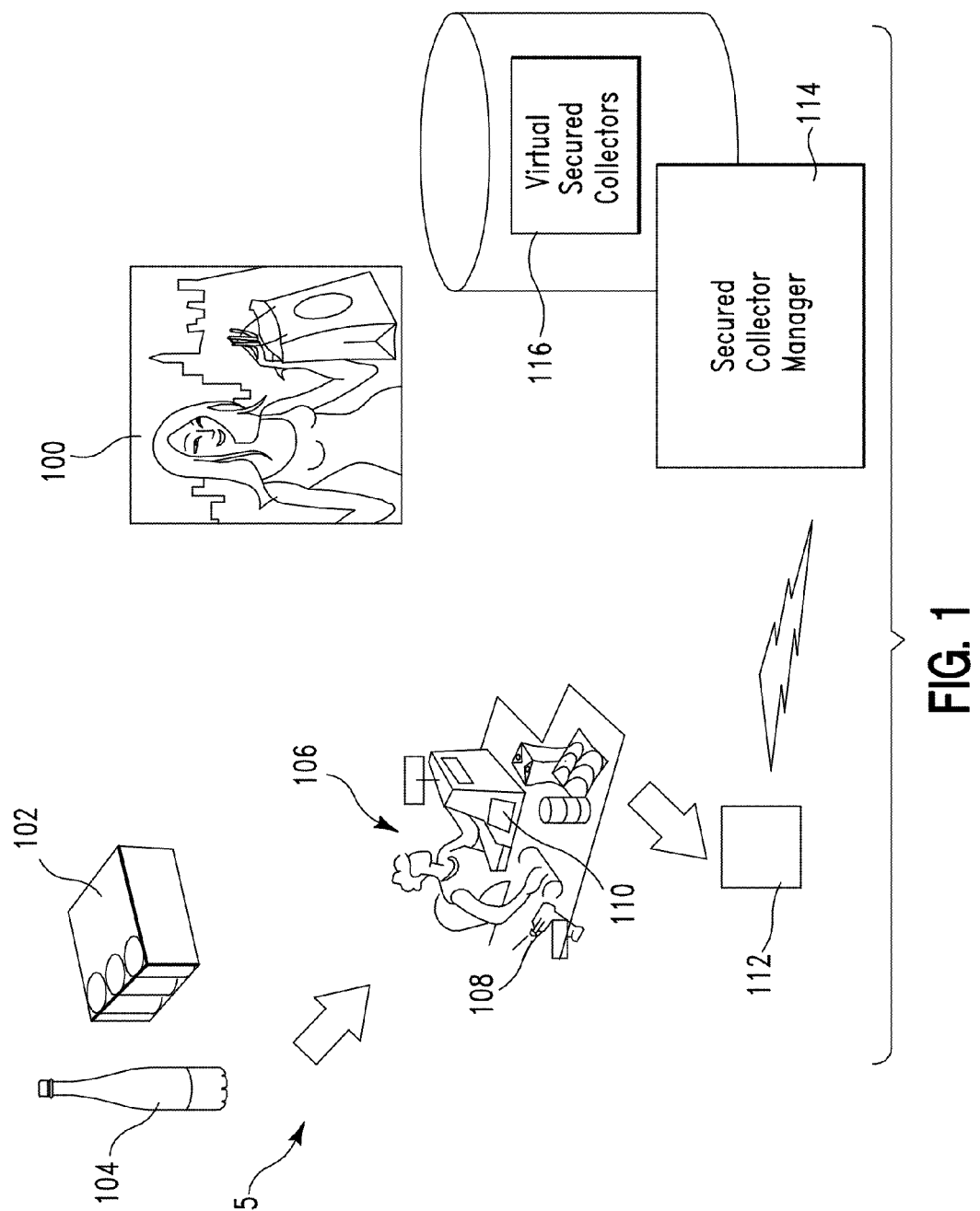
FIG. 1 illustrates a block diagram of a system comprising a computing system, a data reader, a secured collector manager, and virtual secured collectors, in accordance with embodiments of the present invention.

FIG. 1 illustrates a block diagram of a system 5 comprising a computing system 110, a data reader 108, a secured collector manager 114, and virtual secured collectors 116, in accordance with embodiments of the present invention. System 5 is used to securely manage loyalty programs (e.g., campaign programs) for entities (e.g., service companies, retailers, manufacturers of goods such as, inter alia, food products, consumer electronics, etc). A loyalty program is defined herein as a program organized and initiated by an entity for determining buyer (i.e., consumer) loyalty towards the entity (i.e., a number of items from the entity purchased). As a first example, a food manufacturer may initiate a loyalty program that includes monitoring (periodically) a number of items (i.e., manufactured by the food manufacturer) purchased by a buyer during a specified time period and based on the number of items (i.e., manufactured by the food manufacturer) purchased by the buyer during the specified time period, the entity may reward the buyer (e.g., by giving the buyer coupons, cash back, etc). As a second example, a service provider (e.g., an automotive service center) may initiate a loyalty program that includes monitoring (periodically) a number service purchases (e.g., oil changes, brake jobs, tune ups, etc) purchased by a buyer during a specified time period and based on the number service purchases (e.g., oil changes, brake jobs, tune ups, etc) purchased by the buyer during the specified time period, the entity may reward the buyer (e.g., by giving the buyer coupons for services, cash back, free services, etc). In order to monitor the loyalty program, system 5:

1. Retrieves proof of purchases from products or retailers.
2. Retrieves customer identification.
3. Generates secure data comprising the proof of purchases and customer identification.
4. Transmits the secure data to a secure system for storage.

System 5 of FIG. 1 is used to perform the following functions with respect to monitoring and securing a loyalty program for an entity:

1. During a checkout operation (i.e., for purchasing products) all selected products are scanned (e.g., by a bar code reader or an RFID tag reader).
2. For each product, a two dimensional barcode is generated. A two dimensional barcode comprises a two-dimensional matrix barcode consisting of black and white square modules arranged in either a square or rectangular pattern. Information to be encoded (i.e., into the two dimensional barcode) may comprise text data or raw data. Data size may comprise a few bytes up to about 2 kilobytes. A length of the encoded data depends on a symbol dimension used. Error correction codes may be added to increase symbol strength so that even if they are partially damaged, they may still be read. A symbol may store up to 2,335 alphanumeric characters. The two dimensional barcode may comprise information associated with:
   A. A product identifier.
   B. A date of purchase.
   C. Data associated with a selected loyalty program.
   D. An identifier for the purchaser.

Computing system 110 is a data generator. Computing system 110 may comprise any type of computing system including, inter alia, a personal computer, an embedded controller, a barcode generator (e.g., for generating two dimensional bar codes), an RFID tag data generator, etc. Data reader 108 may comprise inter alia, a bar code reader (e.g., for reading one dimensional bar codes), an RFID tag reader, etc. System 5 allows for the following example functions to be performed:
1. A buyer 100 purchases product 102 and product 104. Products 104 and 106 may comprise any type of product or service available for purchase. Products 104 and 106 are part of a purchasing campaign for obtaining rewards (e.g., coupons for services, cash back, free services, etc) based on proof of purchases.
2. During a checkout operation (e.g., without without the help of a cashier 106), data reader 108 (e.g., a one dimensional barcode reader) retrieves data from products 102 and 104 (e.g., reads a barcode available on product 102 and 104).
3. The data retrieved in step 2 is compiled by computing system 110 (e.g., a two dimensional barcode reader, an RFID tag generator, etc) to generate information 112 for the purchasing campaign (e.g., in the form of a two dimensional barcode, RFID tag data, etc).
4. Buyer 100 is identified via a specific access code or loyalty program ID. Information 112 may be generated based on:
   A. A product identifier.
   B. A date of purchase.
   C. An identifier for buyer 100.
5. Information 112 may be generated with a signature identifying a distributor and organism managing a collector campaign and calculated as follows: RSAencrypt (RSAencrypt(Hash(Purchase_info),KprDistributor), KpuOrganism.
6. For each of selected products 102 and 104t, information 112 is transmitted to secured collector manager 114 and stored in virtual secured collectors 116 in a location corresponding to buyer 100.

The following example described with respect to FIG. 1 illustrates an implementation example for system 5 of FIG. 1:
1. Identification for a buyer (e.g., buyer 100) is retrieved.
2. A product (e.g., product 102 and/or 104) scanned during checkout process.
3. A barcode reader (e.g., data reader 108) reads a barcode available on the product.
4. A test is performed to verify (e.g., locally or with a remote server) if the scanned product is part of a purchasing campaign (e.g., using 116 virtual collector).
   A. If the product is not part of a purchasing campaign, information is printed in a standard format on a proof of purchase ticket (e.g., a receipt) and another product is scanned.
   B. If the product is part of a purchasing campaign, information for a two dimensional barcode or RFID tag is generated.
5. A checkout system (e.g., computing system 110) transmits the information (i.e., associated with the purchasing campaign) to secured collector manager 114 and the information is stored in virtual secured collectors 116 in a location corresponding to buyer 100.
6. The information (i.e., associated with the purchasing campaign) may be printed in a two dimensional barcode format onto a proof of purchase ticket or in RFID tags.

Figure 2:
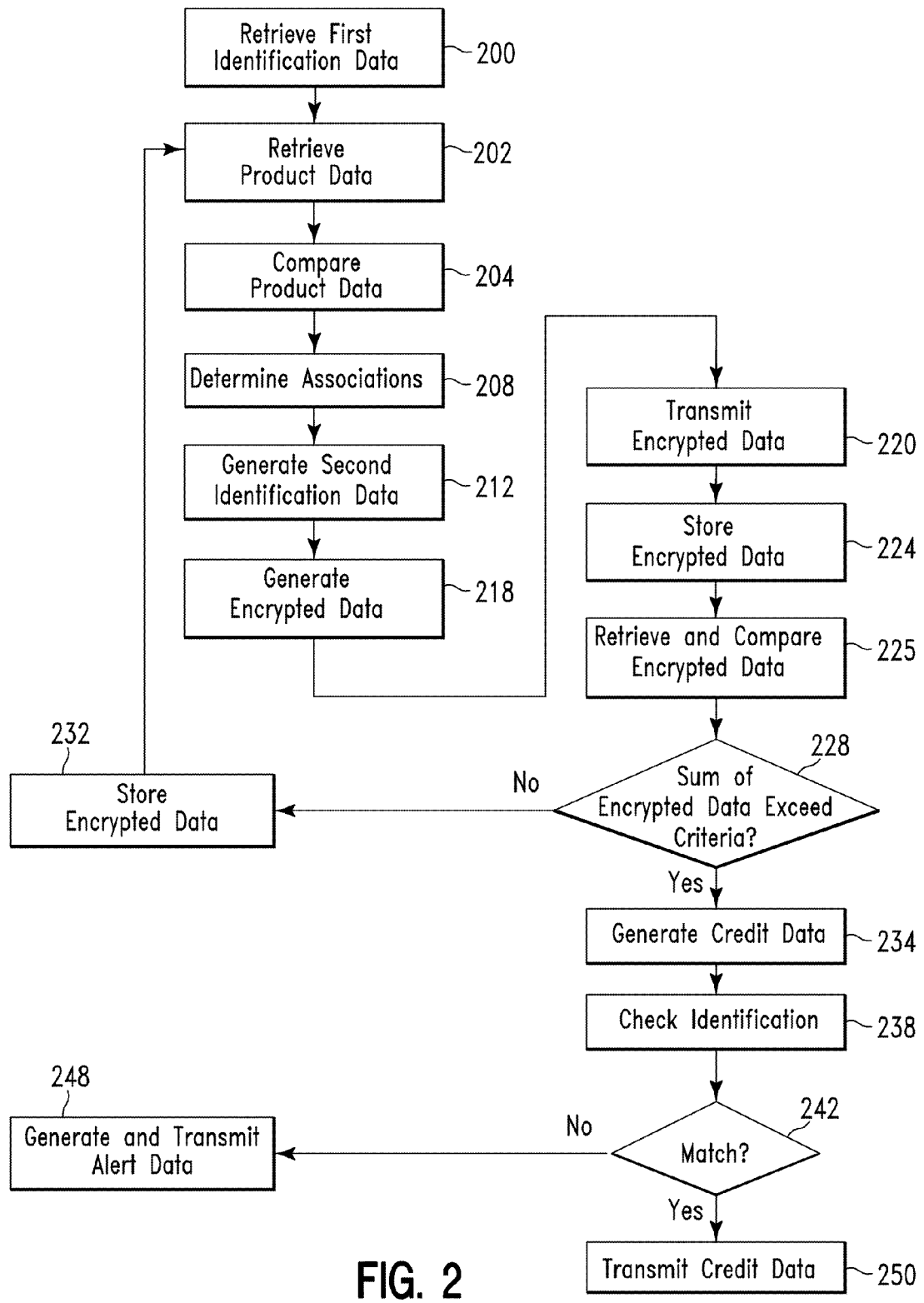
FIG. 2 illustrates a flowchart describing an algorithm used by the system of FIG. 1 for managing loyalty programs for entities, in accordance with embodiments of the present invention.

FIG. 2 illustrates a flowchart describing an algorithm used by system 5 of FIG. 1 for managing loyalty programs for entities, in accordance with embodiments of the present invention. In step 200, a computing system (e.g., computing system 110 of FIG. 1) retrieves first identification data associated with a first buyer. The first identification data may be retrieved via any type of identification source associated with the first buyer including, inter alia, a driver license, an RFID tag, a credit card, etc. In step 202, the computing system retrieves (i.e., from a product or product packaging being purchased by the first buyer) first product data associated with the first product (e.g., data retrieved from a one dimensional bar code). The first product data may be retrieved via data reader 108 of FIG. 1 (e.g., a bar code reader). In step 204, the computing system compares the first product data to campaign data associated with a first campaign (e.g., a purchasing campaign for obtaining rewards based on purchases during a specified time period). The first campaign is associated with a first entity (e.g., company). The first entity is associated with the first product (e.g., a manufacturer of the first product). In step 208, the computing system determines (i.e., based results of step 204) that the first product is associated with the first campaign. In step 212, the computing system generates (i.e., in response results of step 208) second identification data comprising the first identification data, an identification code for the first product, a campaign code indicating that the first product is associated with the first campaign, and a date of purchase for the first product. In step 218, the computing system generates first encrypted data comprising the second identification data in an encrypted format (i.e., encoded). The encryption process may comprise generating a two dimensional bar code comprising the second identification data in an encrypted format. Alternatively, the encryption process may comprise generating encrypted RFID tag data comprising the second identification data in an encrypted format. In step 220, the computing system transmits the first encrypted data to a secured collection manager (e.g., secured collection manager 114 of FIG. 1). In step 224, the first encrypted data is stored in a secured collector database (e.g., virtual secured collectors 116 of FIG. 1). In step 225, the computing system retrieves (i.e., from the secured collector database) the first encrypted data and second encrypted data. The second encrypted data comprises the first identification data, an identification code for a second product, a second campaign code indicating that a second product is associated with the first campaign, and a date of purchase for the second product. Additionally, a sum of the first encrypted data and the second encrypted data is compared to a predetermined criteria (e.g., a total amount of money spent, a total number of purchases, etc) to determine if first purchases defined by the first encrypted data and the second encrypted data exceed the predetermined criteria. In step 228, it is determined if the sum of the first encrypted data and the second encrypted data is exceeds the predetermined criteria.

If in step 228, it is determined that the sum of the first encrypted data and the second encrypted data does not exceed the predetermined criteria then in step 232, the first encrypted data and the second encrypted data is stored in the secured collector database for to add to additional purchases and step 202 is repeated.

If in step 228, it is determined that the sum of the first encrypted data and the second encrypted data does exceed the predetermined criteria then in step 234, the computing system generates credit data specifying credits associated with the first buyer. The credits may be used for purchasing products associated with the first entity, as cash back, as coupons, etc. In step 238, the computing system retrieves second identification data (e.g., associated with a second buyer differing from the first buyer). The computing system retrieves the first encrypted data and compares the first encrypted data to the second identification data. In step 242, the computing system determines (i.e., based on results of step 238) if a match is found between buyer identification data in the second identification data and the first encrypted data. If in step 242, it is determined that a match is found between buyer identification data in the second identification data and the first encrypted data then in step 250, the credit data of step 234 is transmitted to the first buyer. If in step 242, it is determined that a match is not found between buyer identification data in the second identification data and the first encrypted data then in step 248, the computing system determines that the buyer requesting the credits is not authorized to access the first encrypted data and the credit data. Additionally, the computing system may generate alert data (e.g., audio, video, text, etc) indicating that the buyer requesting the credits is not authorized to access the first encrypted data and the credit data. The alert data may be transmitted to an authorized authority entity such as a store security department, a police department, an administrator, etc.

Figure 3:
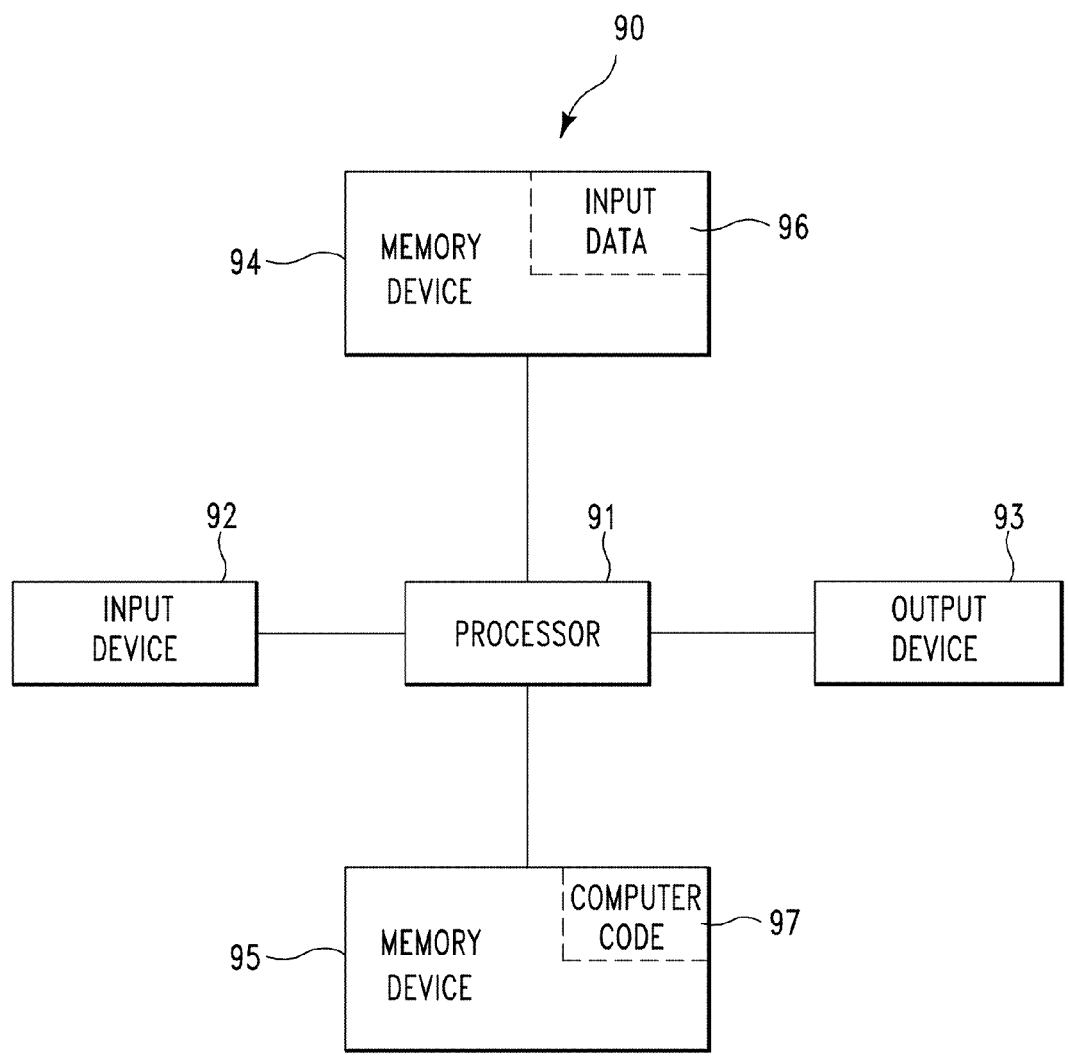
FIG. 3 illustrates a computer apparatus used for managing and securing loyalty programs for entities, in accordance with embodiments of the present invention.

FIG. 3 illustrates a computer apparatus 90 (e.g., computing system 110 of FIG. 1) used for managing and securing loyalty programs for entities, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for managing and securing loyalty programs for entities. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for manage and secure loyalty programs for entities. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for managing and securing loyalty programs for entities. In another embodiment, the invention provides a business method that performs the process steps of the invention on a subscription, advertising, and/or fee basis. That is, a service provider, such as a Solution Integrator, could offer to manage and secure loyalty programs for entities. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method comprising:
retrieving, by a computing system from an RFID tag, first identification data associated with a first buyer, wherein said first buyer is associated with a first purchase of a first product;
automatically retrieving, by said computing system from a one dimensional barcode of said first product, first product data associated with said first product;
comparing, by said computing system, said first product data to campaign data associated with a first campaign for obtaining customer loyalty rewards from a first entity associated with said first product;
determining, by said computing system based on results of said comparing, that said first product is associated with said first campaign, wherein said determining comprises performing a verification test via usage of virtual secured collectors;

generating, by said computing system in response to said determining, second identification data including a signature identifying a distributor and organism managing said purchasing campaign, wherein generating said second identification data comprises generating said second identification based on said first identification data, an identification code for said first product, a campaign code indicating that said first product is associated with said first campaign, and a date of purchase for said first product, and wherein generating said second identification data further comprises calculating said signature as follows:
RSAencrypt(RSAencrypt(Hash(said second identification data),KprDistributor),KpuOrganism);
generating, by said computing system, first encrypted data by encrypting said second identification data, wherein said generating said first encrypted data comprises:
generating, by said computing system, an encrypted two dimensional bar code comprising said first encrypted data;
adding, by said computing system to said two dimensional bar code, error correction codes associated with said first encrypted data;
printing, by said computing system on a proof of purchase ticket for said first buyer, said two dimensional bar code comprising said error correction codes;
reading, by said computing system via said error correction codes increasing a symbol strength of said two dimensional bar code, said two dimensional barcode from a damaged version of said proof of purchase ticket;
transmitting, by said computing system to a location corresponding to said first buyer in said virtual secured collectors, said first encrypted data;
retrieving, by said computing system from said virtual secured collectors, said first encrypted data and second encrypted data, wherein said second encrypted data comprises said first identification data, an identification code for a second product, a second campaign code indicating that a second product is associated with said first campaign, and a date of purchase for said second product;
determining, by said computing system based on data included in said first encrypted data and said second encrypted data, that purchases defined in said first encrypted data and said second encrypted data exceed a predetermined criteria;
generating, by said computing system based on said determining that said purchases defined in said first encrypted data and said second encrypted data exceed said predetermined criteria, credit data specifying cash credits associated with said first buyer for purchasing products associated with said first entity;
retrieving, by said computing system, second identification data associated with a second buyer differing from said first buyer;
retrieving, by said computing system from said virtual secured collectors, said first encrypted data;
determining, by said computing system based on said second identification data and said first identification data in said first encrypted data, that said second buyer is not authorized to access said first encrypted data and said credit data;
generating, by said computing system based on said determining that said second buyer is not authorized to access said first encrypted data and said credit data, alert data indicating that said second buyer is not authorized to access said first encrypted data and said credit data; and
transmitting, by said computing system, said alert data to a store security department or a police department.

2. The method of claim 1, wherein said automatically retrieving said first product data from the one dimensional barcode of said first product comprises retrieving said first product data from packaging for said first product.

3. A computing system comprising a computer processor and a computer-readable memory coupled to said computer processor, said memory comprising instructions that when executed by the computer processor, cause the computer processor to perform the steps of:
retrieving from an RFID tag, first identification data associated with a first buyer, wherein said first buyer is associated with a first purchase of a first product;
automatically retrieving, from a one dimensional barcode of said first product, first product data associated with said first product;
comparing said first product data to campaign data associated with a first campaign for obtaining customer loyalty rewards from a first entity associated with said first product;
determining, based on results of said comparing, that said first product is associated with said first campaign, wherein said determining comprises performing a verification test via usage of virtual secured collectors;
generating, in response to said determining, second identification data including a signature identifying a distributor and organism managing said purchasing campaign, wherein generating said second identification data comprises generating said second identification based on said first identification data, an identification code for said first product, a campaign code indicating that said first product is associated with said first campaign, and a date of purchase for said first product, and wherein generating said second identification data further comprises calculating said signature as follows:
RSAencrypt(RSAencrypt(Hash(said second identification data), KprDistributor), KpuOrganism);
generating first encrypted data by encrypting said second identification data, wherein said generating said first encrypted data comprises:
generating an encrypted two dimensional bar code comprising said first encrypted data;
adding, to said two dimensional bar code, error correction codes associated with said first encrypted data;
printing, on a proof of purchase ticket for said first buyer, said two dimensional bar code comprising said error correction codes;
reading, via said error correction codes increasing a symbol strength of said two dimensional bar code, said two dimensional barcode from a damaged version of said proof of purchase ticket;
transmitting, to a location corresponding to said first buyer in said virtual secured collectors said first encrypted data;
retrieving, from said virtual secured collectors, said first encrypted data and second encrypted data, wherein said second encrypted data comprises said first identification data, an identification code for a second product, a second campaign code indicating that a second product is associated with said first campaign, and a date of purchase for said second product;
determining, based on data included in said first encrypted data and said second encrypted data, that purchases defined in said first encrypted data and said second encrypted data exceed a predetermined criteria;
generating, based on said determining that said purchases defined in said first encrypted data and said second encrypted data exceed said predetermined criteria, credit data specifying cash credits associated with said first buyer for purchasing products associated with said first entity;
retrieving second identification data associated with a second buyer differing from said first buyer;
retrieving, from said virtual secured collectors, said first encrypted data;
determining, based on said second identification data and said first identification data in said first encrypted data, that said second buyer is not authorized to access said first encrypted data and said credit data;
generating, based on said determining that said second buyer is not authorized to access said first encrypted data and said credit data, alert data indicating that said second buyer is not authorized to access said first encrypted data and said credit data; and
transmitting said alert data to a store security department or a police department.

4. The computing system of claim 3, wherein said automatically retrieving said first product data from the one dimensional barcode of said first product comprises retrieving said first product data from packaging for said first product.

5. The computing system of claim 4, wherein said generating said first encrypted data comprises generating RFID tag data comprising said second identification data.

6. A computer program product, comprising computer readable hardware storing a computer readable program code, said computer readable program code comprising an algorithm that when executed by a computer processor of a computing system causes the computer processor to perform the steps of:
retrieving from an RFID tag, first identification data associated with a first buyer, wherein said first buyer is associated with a first purchase of a first product;
automatically retrieving from a one dimensional barcode of said first product, first product data associated with said first product;
comparing said first product data to campaign data associated with a first campaign for obtaining customer loyalty rewards from a first entity associated with said first product;
determining, based on results of said comparing, that said first product is associated with said first campaign, wherein said determining comprises performing a verification test via usage of virtual secured collectors;
generating, in response to said determining, second identification data including a signature identifying a distributor and organism managing said purchasing campaign, wherein generating said second identification data comprises generating said second identification based on said first identification data, an identification code for said first product, a campaign code indicating that said first product is associated with said first campaign, and a date of purchase for said first product, and wherein generating said second identification data further comprises calculating said signature as follows: RSAencrypt(RSAencrypt(Hash(said second identification data),KprDistributor),KpuOrganism);
generating first encrypted data by encrypting said second identification data, wherein said generating said first encrypted data comprises:
generating an encrypted two dimensional bar code comprising said first encrypted data;
adding, to said two dimensional bar code, error correction codes associated with said first encrypted data;
printing, on a proof of purchase ticket for said first buyer, said two dimensional bar code comprising said error correction codes;
reading, via said error correction codes increasing a symbol strength of said two dimensional bar code, said two dimensional barcode from a damaged version of said proof of purchase ticket;
transmitting, to a location corresponding to said first buyer in said virtual secured collectors, said first encrypted data;
retrieving, from said virtual secured collectors, said first encrypted data and second encrypted data, wherein said second encrypted data comprises said first identification data, an identification code for a second product, a second campaign code indicating that a second product is associated with said first campaign, and a date of purchase for said second product;
determining, based on data included in said first encrypted data and said second encrypted data, that purchases defined in said first encrypted data and said second encrypted data exceed a predetermined criteria;
generating, based on said determining that said purchases defined in said first encrypted data and said second encrypted data exceed said predetermined criteria, credit data specifying cash credits associated with said first buyer for purchasing products associated with said first entity;
retrieving second identification data associated with a second buyer differing from said first buyer;
retrieving, from said virtual secured collectors, said first encrypted data;
determining, based on said second identification data and said first identification data in said first encrypted data, that said second buyer is not authorized to access said first encrypted data and said credit data;
generating, based on said determining that said second buyer is not authorized to access said first encrypted data and said credit data, alert data indicating that said second buyer is not authorized to access said first encrypted data and said credit data; and
transmitting said alert data to a store security department or a police department.

* * * * *